United States Patent [19]

Seok-Jae

[11] Patent Number: 5,155,603
[45] Date of Patent: Oct. 13, 1992

[54] APPARATUS FOR TRANSFERRING DOCUMENTS IN A FACSIMILE

[75] Inventor: Jung Seok-Jae, Kyonggi-Do, Rep. of Korea

[73] Assignee: Goldstar Co., Ltd., Rep. of Korea

[21] Appl. No.: 657,475

[22] Filed: Feb. 19, 1991

[30] Foreign Application Priority Data

Feb. 28, 1990 [KR] Rep. of Korea .............. 90-2360

[51] Int. Cl.⁵ ............................................. H04N 1/12
[52] U.S. Cl. ..................................... 358/498; 355/309; 271/265
[58] Field of Search ................... 358/498; 355/309; 271/258, 259, 265

[56] References Cited

U.S. PATENT DOCUMENTS 4,558,373 12/1985 Plasencia et al. .................. 358/498
4,953,037 8/1990 Ho et al. ............................ 358/498

Primary Examiner—Edward L. Coles, Sr.
Assistant Examiner—Jill Jackson
Attorney, Agent, or Firm—Anthony J. Casella; Gerald E. Hespos

[57] ABSTRACT

A transmit text transfer device of a facsimile capable of performing full reproduction of transmit text and error-free feeding of text. A feed roller and a main roller having the same linear velocity are provided to enable sustained text feeding velocity and regularity in interval between a first and a second texts is realized by controlling direction of rotation of a motor gear and by utilizing a gear lever and a one-way bearing that is attached to a main gear.

5 Claims, 4 Drawing Sheets

APPARATUS FOR TRANSFERRING DOCUMENTS IN A FACSIMILE

BACKGROUND OF THE INVENTION

The present invention relates to a text transfer device of a fascimile, and more particularly to a transmit text transfer device which is able to perform one hundred percent complete reproduction of a text and error-free feeding of sheet of text.

In a composition of a conventional transmit text transfer device, as shown in FIGS. 1 and 2, reduction gears 3 are engaged with both sides of a gear 2 of a motor 1 that generates driving force, the two reduction gears 3 are engaged with a main gear 4 of a main roller 5 and a feed gear 4A, of a feed roller 7. The main gear 4 has a total of $Z_M$ gear teeth and the feed gear 4A has a total of $Z_F$ gear teeth. A pinch roller 8 is in close contact with circumference of the feed roller 7, and a separating rubber plate 6 is in close contact with circumference of the main roller 5.

In conventional composition, for the main roller 5, a main roller shaft 13 is inserted into a center hole that goes through from one end to the other end of the main roller 5, in such a way that an inner slide 12, into which a fixing pin 11 is inserted, is inserted as well in order to fix the axis of the main roller 5, and as shown in FIG. 3, an outer slide 10, which is formed with an angle of $\theta$, is inserted into on the outer surface of the inner slide 12. And at both ends of the main roller shaft 13, as shown in FIGS. 1 and 2, the axis of the main gear 4 is fixed having a one-way bearing 14 inserted therein, in order to cut or transfer driving force to the main roller 5.

In the conventional transmit text transfer device as shown above, when linear velocities of the main roller 5 and the feed roller 7 are represented by $V_M$ and $V_F$, respectively, and relationship between $V_M$ and $V_F$ is $V_M = V_F$ or $V_M < V_F$, the imbalance between the two velocities can be corrected either by adjusting diameters of the main roller 5 and the feed roller 7 to be the same on the one hand and velocity reduction ratio of engaged gears to have a ratio of $Z_M < Z_F$ on the other hand, or by controlling velocity reduction ratio of the engaged gears to have a ratio of $Z_F = Z_M$ on the one hand and ratio of diameters of the main roller 5 and the feed roller 7 to have a ratio of $D_M < D_F$ on the other hand. However, the latter is more often used in conventional transmit text transfer device, therefore, when sheet of text is bitten by the main roller 5, the main roller 5 is run idle by one-way bearing 14 that is engaged with the main gear 4, in order that transmit sheet of text is transferred by linear velocity of the feed roller.

In maintaining an interval between one transmit sheet of text and the next, linear velocity difference is generated between the main roller 5 and the feed roller 7 while one sheet of text is completely fed and the next sheet of text is ready to be fed, and the linear velocity difference lets the one-way bearing 14 run the main roller 5 by the degree of $\theta$ as shown in FIG. 3B, thereby, when the next sheet of text is bitten by the main roller 5, the main roller 5 runs idle by the degree of $\theta$ even though the main gear 4A transfers driving force to the main roller 5, resulting in that the interval as far as circumferential distance of the $\theta$ is generated between one sheet of text and the next sheet of text.

Thereby, the conventional transmit text transfer device has a setback that at the time before a sheet of text is bitten by the feed roller 7 at a reading position 9 with the sheet of text bitten by the main roller 5, i.e., at the time when the sheet of text is fed as far as a distance A as shown in FIG. 4A, the sheet of text is affected by the linear velocity of the main roller 5, thereby, transfer distance of the sheet of text becomes shorter than the transfer distance of when the sheet of text is bitten by both the main roller 5 and the feed roller 7, i.e., when the text is under the influence of the linear velocity of the main roller 5, therefore, one hundred percent reproduction of the transmit text is not realized.

SUMMARY OF THE INVENTION

It is accordingly an object of the present invention to provide a transmit text transfer device that can fully reproduce a transmit text by feeding a sheet of text at a sustained velocity, shifting rotation direction of a driving system, and maintaining distance between first sheet of text and next sheet of text at a given interval.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
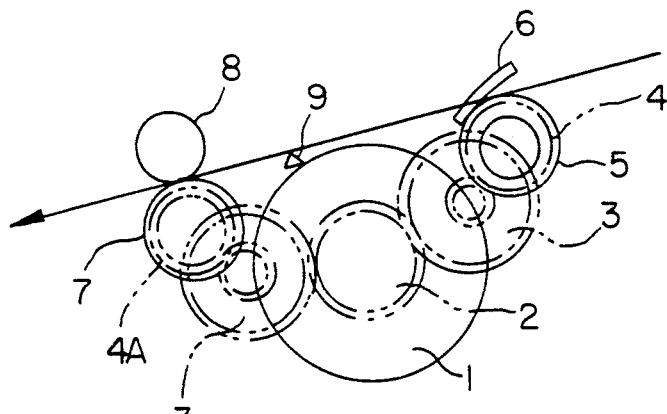
FIG. 1 is a diagram showing a status of a conventional transmit text transfer system.
Figure 2:
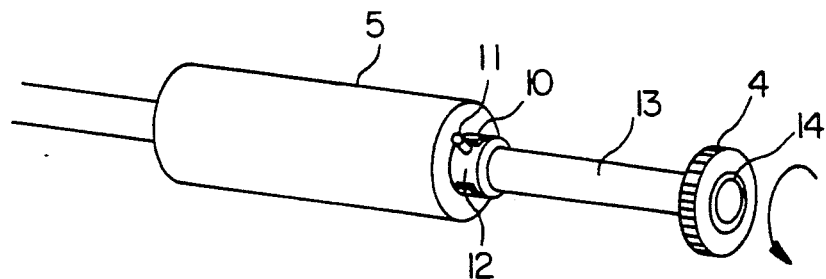
FIG. 2 is a side-glance view of a main roller of the conventional transmit text transfer system.
Figure 3A:
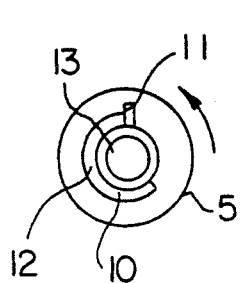
FIGS. 3A, 3B are diagrams showing operating status of the main roller of the conventional transmit text transfer system.
Figure 3B:
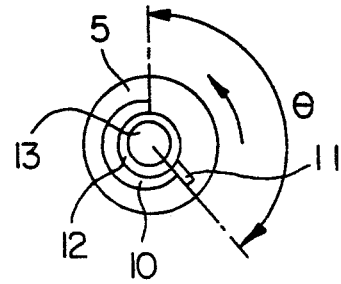
Figure 4A:
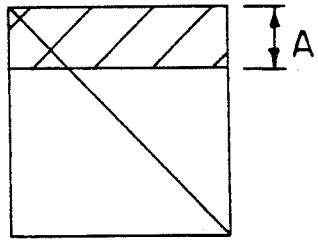
FIG. 4A is a diagram illustrating a sheet of text passing through the conventional transmit text transfer system.
Figure 4B:
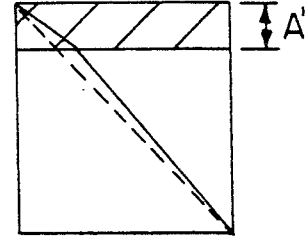
FIG. 4B is a diagram illustrating a status of reproduced sheet of text transmitted by the conventional transmit text transfer system.
Figure 5:
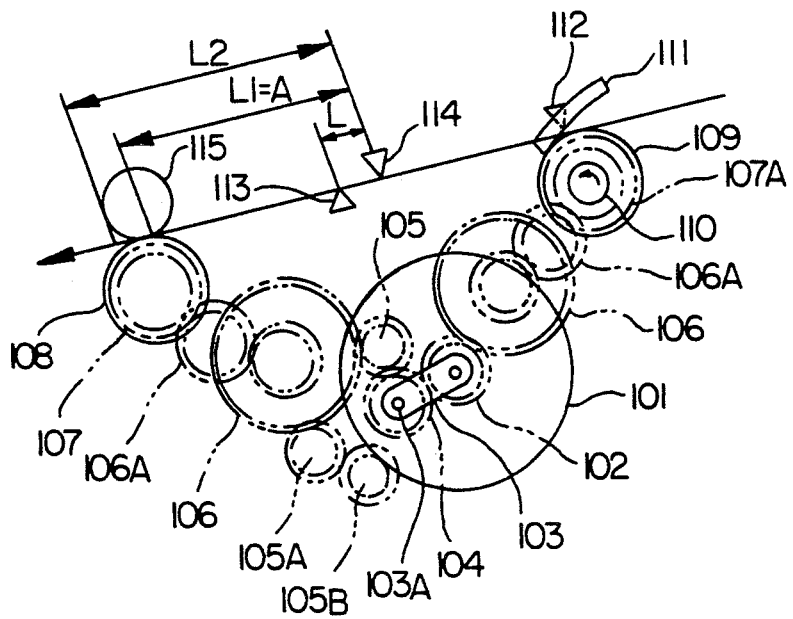
FIG. 5 is diagram showing a status of a transmit text transfer system according to the present invention.

Turning now to FIG. 5, a motor gear 102 is fixed to an axis of a driving motor 101 that generates driving force, and then one end of a gear lever 103 is inserted into the motor gear 102 and the other end of the gear lever 103, to which a pinion gear 104 is inserted with an axis 103A, is engaged with the motor gear 102.

A first idler gear 105 is placed in engagement with the pinion gear 104, the first idler gear 105 and the motor gear 102 are engaged with reduction gears 106, respectively, and the reduction gears 106 are engaged with idler gears 106A. And the idler gear 106A on the part of the first idler gear 105 is engaged with the feed gear 107, the idler gear 106A on the part of the motor gear 102 is engaged with another main gear 107A, teeth of the reduction gear 106, of which teeth are engaged with the first idler gear 105, are engaged with teeth of a second idler gear 105A therebelow, and the second idler gear 105A is tooth-engaged with a third idler gear 105B. The first and the third idler gears 105, 105B are located at a place to be engaged with the pinion gear 104 when the gear lever 103, which links the pinion gear 104, rotates upward, downward, i.e., forward and backward centered around the motor gear 102. In addition, axial hole of the main gear 107A, into which a one-way bearing 110 is inserted, is assembled with an axis end of the main gear 107A. And the feed gear 107 is inserted into axis of the feed roller 108 and a pinch roller 115 is in close contact with circumference of the feed roller 108. And the main roller 109 has a separation rubber plate 111 thereon.

In the above composition, the feed roller 108 and the main roller 109 have the same outer diameter, thereby linear velocity $V_F$ of feed roller 108 and linear velocity $V_M$ of the main roller 109 becomes the same as well. In the diagrams, of the numerals that are not described yet, numeral 112 represents a text sensor for checking, whether or not there is a sheet of text, numeral 113 represents reading sensor, and numeral 114 represents read start sensor.

In the present invention having the composition described above, the feed roller 108 and the main roller 109 have the same linear velocity so that sheet of text can be fed at the same velocity of $V_F = V_M$ regardless of whether the sheet of text is bitten by the main roller 109 or by the feed roller 108, and interval between sheets of text is generated by controlling direction of rotation of the motor gear 102 and by the gear lever 103 and the one-way bearing 110 that is attached to the main gear 109.

Figure 6A:
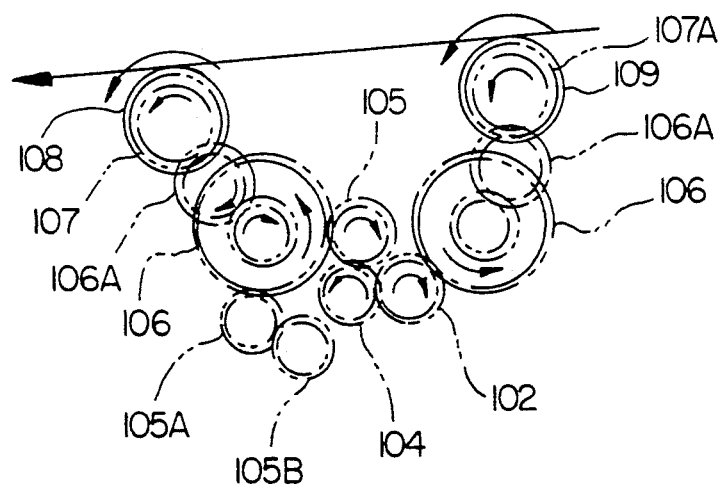
FIG. 6A is a diagram illustrating a forward transfer status of the transmit text transfer system according to the present invention.
Figure 6B:
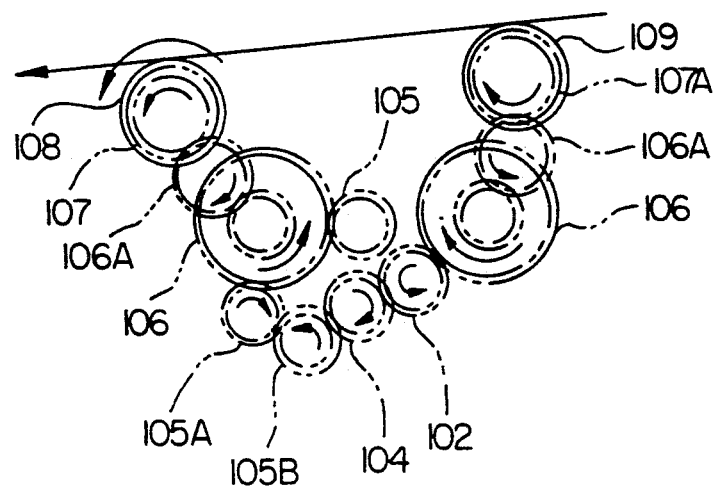
FIG. 6B is a diagram illustrating a backward transfer status of the transmit text transfer system according to the present invention.
Figure 7:
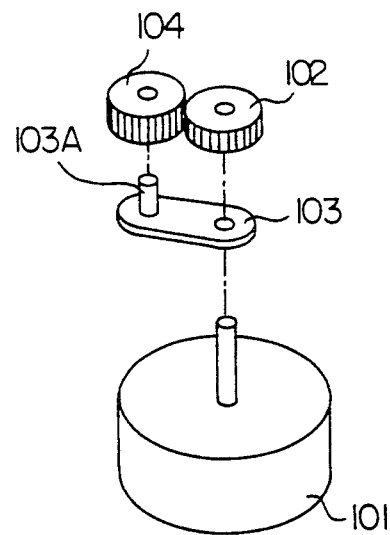
FIG. 7 is a side-glance view showing knock-down motor driving part of the transmit text transfer system according to the present invention.
Figures 8A, 8B:
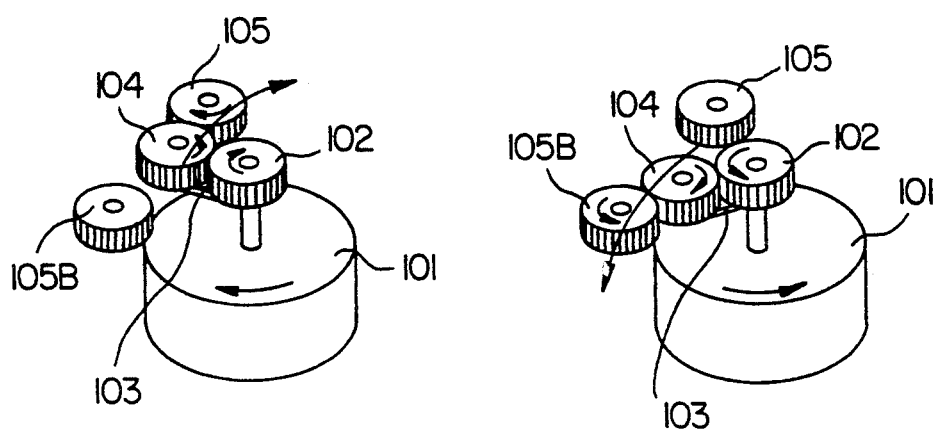
FIG. 8A is a diagram showing a forward transfer status of the transmit text transfer system according to the present invention.
FIG. 8B is a diagram showing a backward transfer status of the transmit text transfer system according to the present invention.

Turning now to more detailed description of the above said generation of the interval, when a sheet of text is bitten in-between the main roller 109 and the separation rubber 111, the text sensor 112 senses the text and drives the main roller 109 in the forward direction, i.e., to the direction, which is text transfer direction, pointed by arrow that is illustrated in FIG. 6A. The sheet of text fed by the main roller 109 is sensed by the read start sensor 114 and travels across a transfer distance L and reading is performed at the reading sensor 113. And then the text continues to be transferred and at the times when the text is bitten by the feed roller 108, i.e., at the time when the text is transferred as far as a transfer distance L1 (= A distance) sensed by the read start sensor 114 (here, the text is bitten by the main roller 109 and the feed roller 108 but there is no problem in text transfer. That is, when there is a linear velocity difference because of difference in diameter of the two rollers, the sheet of text bitten in between the two rollers get wrinkled), the gear lever 103 to downward direction, then pinion gear 104 is driven in close contact with the third idler gear 105B and thereby, the main roller 109 driven in the reverse direction (i.e., clockwise direction) as described in FIG. 6B.

Herein, the feed roller 108 rotates with the pinion gear 106 and idler gears 105, 105A, 105B, but no driving force is transferred to the main roller 109 due to the one-way bearing 110, thereby the next sheet of text remains stopped. Accordingly, an interval is generated between the first and the next sheet of text. And the first sheet of text is transferred as far as distance L2 and feeding of the first sheet of text is completed when the sheet of text leaves the feed roller 108. And then, the next sheet of text at the main roller 109 is sensed by the text sensor 112 and motor is driven again in forward direction, i.e., text feeding direction pointed by the arrow as shown in FIG. 6A, thereby, the next sheet of text is fed and the operation described in the foregoing is repeated again. Here, if no sheet of text is sensed by the text sensor 112, the transmit text transfer system stops at the state where the first text has left the feed roller 108.

As described in the foregoing, the present invention has an effect that full reproduction of a transmitted text by feeding sheet of text at a sustained velocity every time, and an advantage that reliability of product function is improved by maintaining interval between the first and the next sheets of text regardless size of sheet of text size by changing rotation direction of the transfer system.

What is claimed is:

1. A text transfer device for a facsimile for feeding a plurality of sheets in a text feeding direction, comprising:
    a driving motor for generating driving force, capable of rotating forward and backward;
    a motor gear fixed to an axis of the driving motor;
    a main roller having a main gear and a one-way bearing for permitting rotation of the main roller only in the text transfer direction;
    a feed roller having a feed gear, said main roller and said feed roller having equal diameters;
    a reading sensor for reading a text inputted to the facsimile;
    first transfer means for transferring the driving force of said motor gear to said feed roller, said first transfer means comprising a gear lever pivotally mountable to the axis of the driving motor, a pinion gear meshed with said motor gear and pivotally mounted to the gear lever, such that said pinion gear and said gear lever move in a forward direction about the motor gear when the driving motor is rotating forward and such that the pinion gear and the gear lever rotate about the motor gear in a backward direction when the driving motor is rotating backwards, a first idler gear disposed for meshing with the pinion gear when the pinion gear is moved forward, said first idler gear being operatively connected to the feed roller for enabling the pinion gear to drive the feed roller in the text transfer direction, second and third idler gears meshed with each other, said second idler gear being operatively connected to the feed roller, the third idler gear being disposed to mesh with the pinion gear when the pinion gear is moved backward, such that the feed roller is rotatably driven for feeding sheets in a text transfer direction while the motor is rotating backward; and
    second means for transferring driving force of said motor gear to said main roller, wherein said driving force transferred to the main roller when the driving motor is rotating forward is equal to said driving force transferred to said feed roller, and whereby the one-way bearing prevents driving of the main roller when the driving motor is rotating backward.

2. The text transfer device for a facsimile as claimed in claim 1, further comprising:
- a pinch roller parallel to and in engagement with said feed roller;
- a separation rubber plate in contact with said main roller;
- a text sensor in proximity to the main roller and the separation rubber plate for checking whether or not a text is fed at said main roller; and
- a read start sensor for checking whether or not said text is transferred as far as a predetermined read start point.

3. A text transfer device for a facsimile as claimed in claim 2, wherein said driving motor is rotated in said forward direction when said text sensor senses said text fed at said main roller.

4. A text transfer device for a facsimile as claimed in claim 2, wherein said driving motor is rotated in said backward direction when said text is transferred a sufficient distance from said read start sensor for the sheet to be engaged by the feed roller, accordingly said main roller gear is driven backward and said main roller is rotatably undriven due to the one-way bearing such that a next sheet of said text is stopped so that an interval between a first sheet and the next sheet of said text is established.

5. A text transfer device for a facsimile for feeding each of a plurality of sheets in a text feeding direction, comprising:
- a driving motor for generating a driving force and capable of rotating forward and backward;
- a motor gear fixed to an axis of the driving motor;
- a main roller having a main gear;
- a feed roller having a feed gear, said main roller and said feed roller having equal diameters;
- first transfer means for transferring the driving force of said motor to said feed roller for rotatably driving the feed roller in a direction for feeding the sheets in the text feeding direction both during forward rotating of the driving motor and during backward rotating thereof;
- second transfer means for transferring the driving force of said motor to said main roller when the motor is rotating forward and for delivering no driving force to the main roller when said driving motor is rotating backward;
- a text sensor in proximity to the main roller for checking whether or not a text is fed at said main roller;
- a read start sensor for checking whether or not said text is transferred as far as a predetermined read start point;
- a reading sensor for reading text inputted as far as said read start point; and
- said driving motor being operative for rotating forward when said text sensor senses said text fed at said main roller and being operative for rotating backward when said text is transferred as far as said feed roller.

* * * * *